(12) United States Patent
Kuwabara

(10) Patent No.: US 7,440,145 B2
(45) Date of Patent: Oct. 21, 2008

(54) IMAGE DATA CREATING METHOD AND APPARATUS

(75) Inventor: Takao Kuwabara, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1113 days.

(21) Appl. No.: 10/714,846

(22) Filed: Nov. 18, 2003

(65) Prior Publication Data

US 2004/0095613 A1 May 20, 2004

(30) Foreign Application Priority Data

Nov. 19, 2002 (JP) .............................. 2002-335204

(51) Int. Cl.
H04N 1/387 (2006.01)
G06K 15/00 (2006.01)

(52) U.S. Cl. ..................................... 358/450; 358/1.18

(58) Field of Classification Search ................ 358/474, 358/450, 1.18; 382/167, 128, 154, 284, 159; 348/239, 607
See application file for complete search history.

(56) References Cited

U.S. PATENT DOCUMENTS

| | | | |
|---|---|---|---|
| 4,338,673 A * | 7/1982 | Brown | 345/469 |
| 5,227,869 A * | 7/1993 | Degawa | 348/607 |
| 5,373,347 A | 12/1994 | Shaklee et al. | |
| 6,348,981 B1 | 2/2002 | Walsh | |
| 6,385,349 B1 | 5/2002 | Teo | |
| 6,546,152 B1 * | 4/2003 | Hou | 382/284 |
| 6,717,614 B1 * | 4/2004 | Iida | 348/239 |
| 6,754,379 B2 * | 6/2004 | Xiong et al. | 382/154 |
| 6,941,029 B1 * | 9/2005 | Hatori | 382/284 |
| 7,027,627 B2 * | 4/2006 | Levin et al. | 382/128 |
| 7,260,258 B2 * | 8/2007 | Foote et al. | 382/167 |
| 2004/0008282 A1 * | 1/2004 | Kawabata et al. | 348/625 |
| 2004/0184657 A1 * | 9/2004 | Lin et al. | 382/159 |

FOREIGN PATENT DOCUMENTS

| | | | |
|---|---|---|---|
| JP | 63-48052 A | | 2/1988 |
| JP | 63-48054 A | | 2/1988 |
| JP | 10155087 | * | 6/1998 |
| JP | 2002-57860 A | | 2/2002 |

OTHER PUBLICATIONS

Japanese Abstract No. 63 048084, dated Feb. 29, 1988.
Japanese Abstract No. 63 048052, dated Feb. 29, 1988.

* cited by examiner

*Primary Examiner*—Jerome Grant, II
(74) *Attorney, Agent, or Firm*—Sughrue Mion, PLLC

(57) ABSTRACT

An image data creating method and apparatus capable of preventing quality degradation of the image created by combining a plurality of image portions sharing a common region. The light reflected at the linear region on the original upon the irradiation of light from the linear light source is detected by the linear detecting means with the original being moved in the sub-scanning Y direction with respect to two linear sensors having a plurality of light receiving sections disposed linearly in the main scanning X direction such that light receiving sections located on the end portions of the respective linear sensors detect light emitted from the same position on the original in duplicate, and the image data detected either of the light receiving sections located on the end portions of the respective linear sensors are adopted as the image data representing the position on the original.

17 Claims, 14 Drawing Sheets

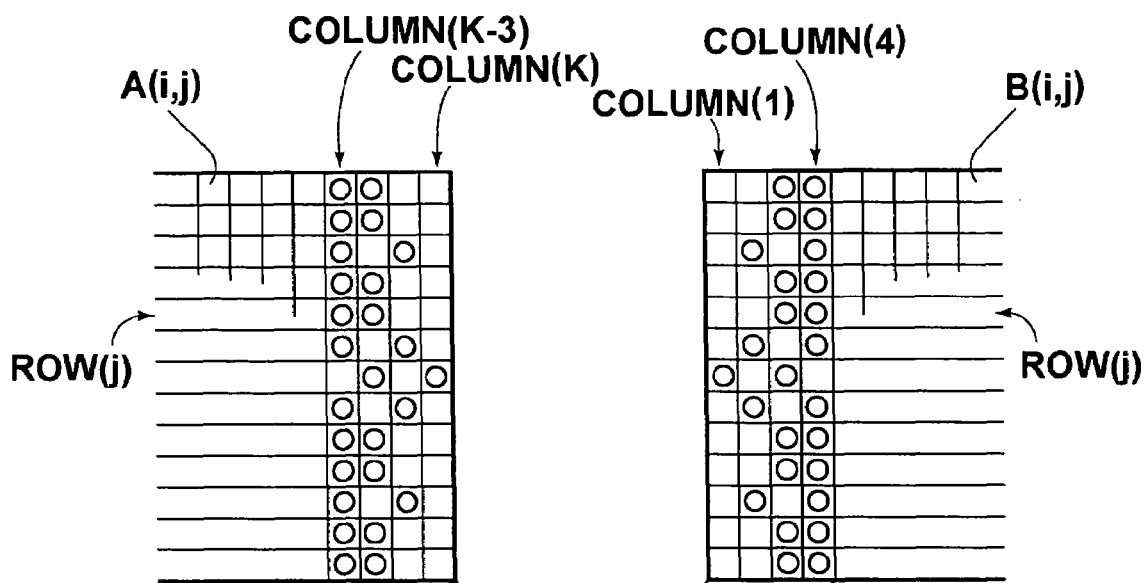
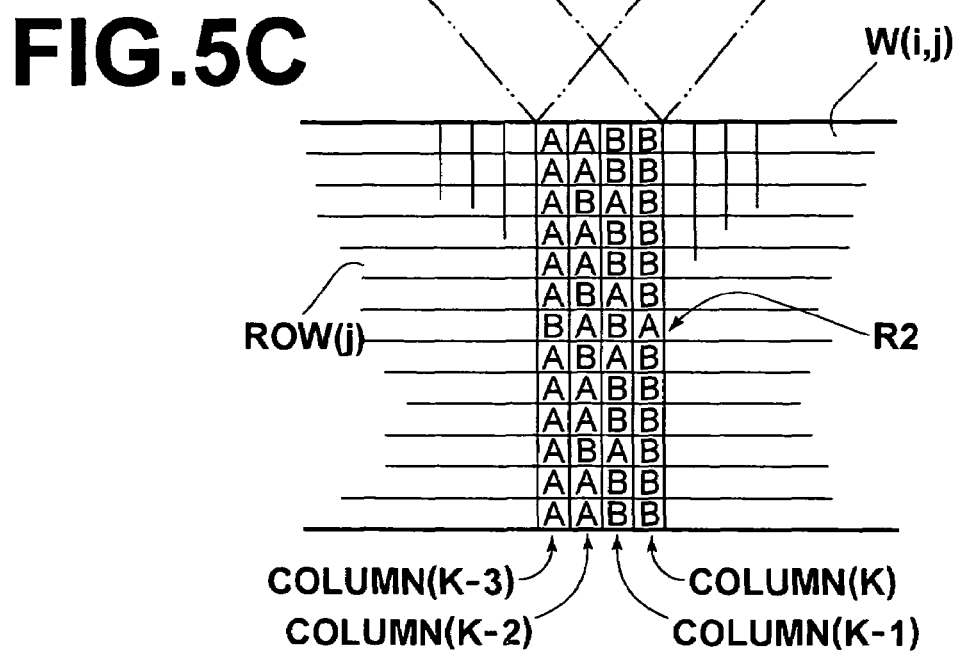

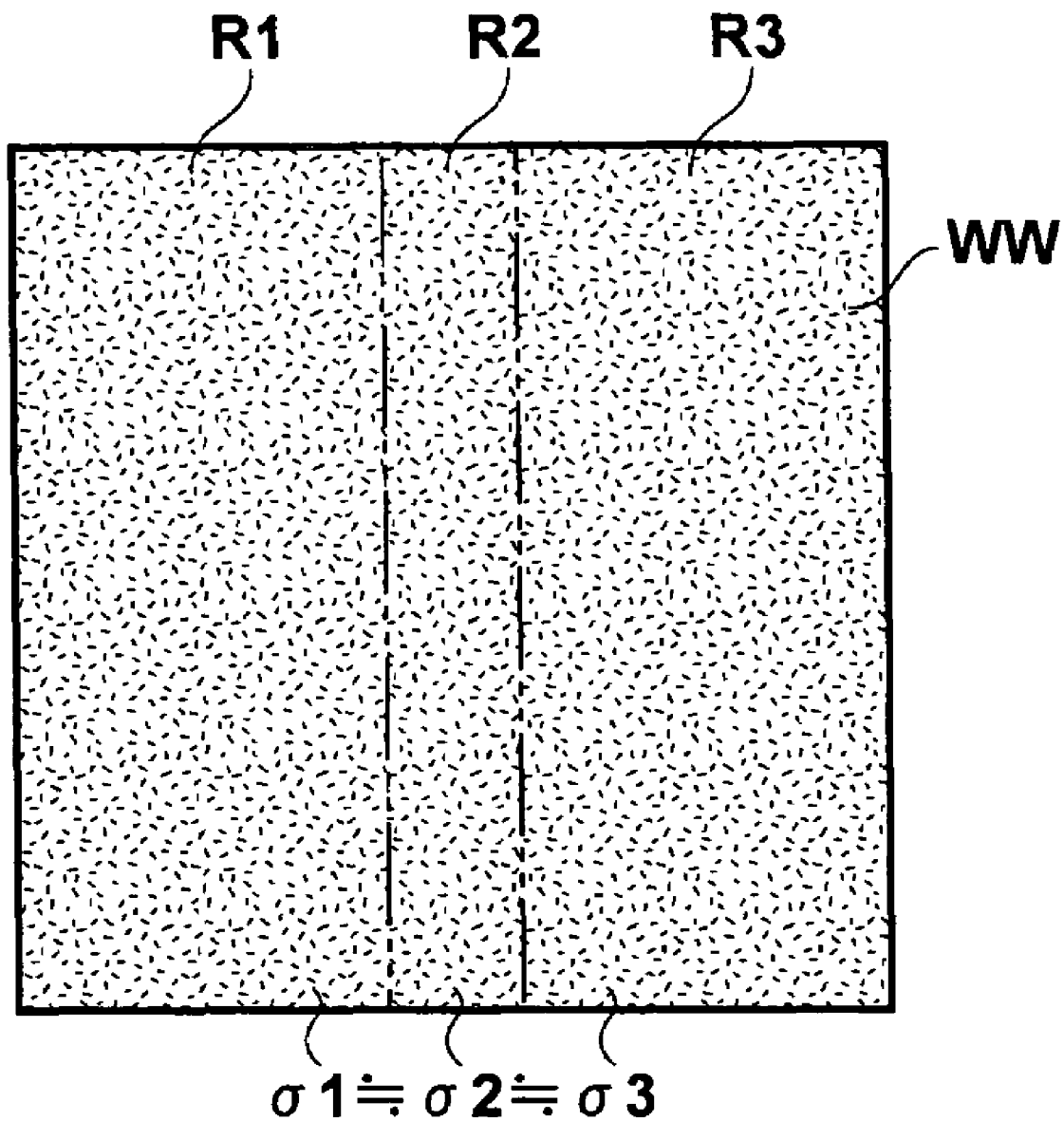

$\sigma 1' > \sigma 2' < \sigma 3'$

IMAGE DATA CREATING METHOD AND APPARATUS

BACKGROUND OF THE INVENTION

1. Field of the Invention

The present invention relates to an image data creating method and apparatus, and more specifically to an image data creating method and apparatus for creating image data representing a single image by combining a plurality of image data representing a plurality of image portions sharing a common region.

2. Description of the Related Art

A system for reading out an original is known, in which a linear detecting section comprising a linear sensor having a plurality of light receiving sections disposed linearly in the main scanning direction is moved over the original in the sub-scanning direction. In reading out a large-sized original with the system described above, a wide linear detecting section comprising a long linear sensor is used, which is formed of a plurality of shorter linear sensors disposed in the main scanning direction such that their ends are overlapped with each other to act collectively as a long single linear sensor, since it is difficult to realize such a long seamless sensor because of the constraints imposed by the manufacturing process.

When a large-sized original is read out by the linear detecting means formed in the manner described above, a single position on the large-sized original is detected by the light receiving sections disposed on the end portion of each of the mutually overlapped linear sensors in duplicate, and the image data (also referred to as "image data group"),representing a portion of the large-sized original sharing the same position is obtained by each of the linear sensors, and then these image data groups are combined to create the image data representing a complete large-sized original.

As for the method of creating image data representing a complete large-sized original by combining a plurality of image data groups, each representing a portion of the large-sized original, a method in which image data groups obtained by respective sensors are simply linked together by delimiting each of the image data groups, and an improved technique of this method in which a plurality of image data representing the same position on the large-sized original detected by the light receiving sections disposed on the mutually overlapped end of each of the sensors are averaged such that the image data obtained by a light receiving section located closer to the end of the sensor are allocated a smaller weighting factor to obtain the image data of the respective positions, and the image data representing the complete large-sized original are created by using these data are described, for example, in Japanese Unexamined Patent Publication No. 2002-57860, and U.S. Pat. No. 6,348,981. Here, the region represented by the image data obtained through the weighted averaging in the image of the complete large-sized original is a strip-like region extending in the sub-scanning direction.

The weighted averaging method described above, however, has a drawback that streaks may appear along the strip-like region due to the difference in noise element contained in the strip-like region where the weighted averaging is implemented, and the image region other than the strip-like region where no weighted averaging is implemented, causing quality degradation in the overall image of the large-sized original.

The streaks appearing along the strip-like region are due to the difference in the texture of the image caused by the difference in noise element contained in the image data representing the strip-like region and the image data where no weighed averaging is implemented, which has resulted from the reduced noise element in the strip-like region through the averaging effect of the weighted averaging.

The problem described above is not limited to the case in which a plurality of linear sensors are moved over an original to obtain the image data, but common to the methods in which an arithmetic operation, such as the weighted averaging, is implemented on a plurality of image data groups, each representing a portion of image that shares a common region, in order to combine them to create image data representing a single complete image.

SUMMARY OF THE INVENTION

The present invention has been developed in recognition of the circumstance described above, and it is an object of the present invention to provide an image data creating method and apparatus capable of preventing quality degradation of an image created by combining a plurality of image portions that share a common region.

The image data creating method of the present invention is an image data creating method for creating image data representing a single complete image by combining a plurality of image data groups, each representing a portion of the image with a common region being shared with each other, wherein the image data representing the complete image are created by adopting either of a plurality of image data belonging to the respective image data groups and representing the same position in the common region of the complete image as the image data representing each of the positions in the common region.

In adopting either of a plurality of image data representing the same position, the image data creating method described above may be adapted to select the image data at random and further in such a way that the image data located closer to the end of the image data group are selected at a lower selection rate.

The image data creating apparatus of the present invention is an image data creating apparatus for creating image data representing a single complete image by combining a plurality of image data groups, each representing a portion of the image with a common region being shared with each other, wherein the image data representing the complete image are created by adopting either of the plurality of image data belonging to respective image data groups and representing the same position in the common region of the complete image as the image data representing each of the positions in the common region.

In adopting either of a plurality of image data representing the same position, the image data creating apparatus described above may be adapted to select the image data at random, and further in such a way that the image data located closer to the end of the image data group are selected at a lower selection rate.

The term, "adopting either of the plurality of image data belonging to respective image data groups and representing the same position" means that the image data belonging to respective image data groups are selected in a mixed manner.

Another image data creating method of the present invention is an image data creating method for creating image data representing image information carried by an image carrier by detecting the light emitted from the image carrier with a linear detecting means formed of a plurality of sensors disposed in the main scanning direction such that the light receiving sections disposed on the end portion of each of the plurality of sensors detect the light emitted from the same position of the image carrier in duplicate, with the image carrier being moved in the sub-scanning direction that crosses the main scanning direction with respect to the linear detecting means, wherein the image data representing the complete image information are created by adopting image data obtained by either of the light receiving sections of the plurality of the sensors that have detected the light emitted from the same position in duplicate as the image data representing the position the light therefrom has been detected in duplicate.

In selecting image data obtained by either of the light receiving sections that have detected the light in duplicate, the image data creating method described above may be adapted to select the image data at random, and further in such a way that the image data obtained by a light receiving section located closer to the end of the sensor are selected at a lower selection rate.

Another image data creating apparatus of the present invention is an image data creating apparatus comprising: a linear detecting means formed of a plurality of sensors disposed in the main scanning direction such that light receiving sections located on the end portion of each of the plurality of sensors detect the light emitted from the same position of an image carrier in duplicate; a scanning means for moving the image carrier in the sub-scanning direction that crosses the main scanning direction with respect to the linear detecting means; and an image data creating means for creating image data representing image information carried by the image carrier based on the image data obtained by the linear detecting means by detecting the light emitted from the image carrier with the image carrier being moved in the sub-scanning direction that crosses the main scanning direction with respect to the linear detecting means, wherein the image data creating means comprises an image data selecting means for selecting image data obtained by either of the light receiving sections of the plurality of sensors that have detected the light emitted from the same position in duplicate as the image data representing the position the light therefrom has been detected in duplicate, and the image data representing the complete image information are created by adopting the image data selected by the image data selecting means as the image data representing the position the light therefrom has been detected by the light receiving sections of the plurality of sensors in duplicate.

The term "adopting the image data obtained by either of the light receiving sections of the plurality of the sensors that have detected the light emitted from the same position in duplicate" means that the image data are selected from the respective image data obtained by the plurality of sensors in a mixed manner.

In selecting image data obtained by either of the light receiving sections that detected the light in duplicate, the image data selecting means described above may be adapted to select the image data at random and further in such a way that the image data obtained by the light receiving section located closer to the end of the sensor are selected at a lower selection rate.

The light emitted from the image carrier described above means the light reflected at the image carrier, passed through the image carrier, generated from the image carrier by the irradiation of excitation light, etc., and the like that carries image information.

As for the image carrier described above, for example, a sheet of paper or film having image information formed thereon, radiation image conversion panel formed of storage phosphor layers layered on a substrate, and the like may be used. When a radiation image conversion panel is used as the image carrier, stimulated luminescence emitted from the storage phosphor layers by the irradiation of excitation light, i.e., the light representing the radiation image (image information) recorded on the storage phosphor layers as a latent image.

In creating image data representing a single complete image by combining a plurality of image data groups, each representing a portion of an image that shares the common region of the image, the image data creating method and apparatus of the present invention create the image data representing the complete image by adopting either of the plurality of image data belonging to respective image data groups and representing the same position of the common region of the complete image as the image data representing each of the positions of the common region, so that the difference in noise element contained in the common region and the rest of the region of a complete image may be prevented from developing and the difference in the image texture of the respective regions may be reduced, thus the overall quality degradation of the combined image may be prevented. Here, when the common region has an elongated shape, for example, streaks along the region may be prevented from appearing by the effect of reducing the difference in the image texture of the respective regions.

Further, in adopting either of the plurality of the image data representing the same position, if the image data are selected at random and also in such a way that the image data located closer to the end of the image data group are selected at a lower selection rate, the image texture from the region shared by the image data groups to the rest of the region of the complete image may be varied smoothly, thereby the overall quality degradation may be prevented.

In creating image data representing image information carried by an image carrier by moving the image carrier in the sub-scanning direction that crosses the main scanning direction with respect to a linear detecting means formed of a plurality of sensors disposed in the main scanning direction such that the light receiving sections disposed on the end portion of each of the plurality of sensors detect the light emitted from the same position of the image carrier in duplicate, and detecting the light emitted from the image carrier with the linear detecting means, another image data creating method and apparatus of the present invention create the image data representing the complete image information by adopting the image data obtained by either of the light receiving sections of the plurality of sensors that have detected the light emitted from the same position in duplicate as the image data representing the position the light therefrom has been detected in duplicate, so that the difference in noise element of the image region represented by the image data detected by the light receiving sections of the plurality of sensors in duplicate, and the rest of the region of the complete image may be prevented from developing and the difference in the image texture of the respective regions may be reduced, thus the overall quality degradation of the complete image may be prevented. Here, for example, streaks along the region represented by the image data of the positions on the image carrier detected by the light receiving sections by receiving the light emitted therefrom in duplicate may be prevented from appearing by the effect of reducing the difference in the image texture of the respective regions.

Still further, in selecting the image data obtained by either of the light receiving sections that have detected the light emitted from the image carrier in duplicate, if the image data selecting means is adapted to select the image data at random and also in such a way that the image data obtained by a light receiving section disposed closer to the end of the sensor are selected at a lower selection rate, the image texture from the region represented by the image data obtained by the light receiving sections by detecting the light emitted therefrom in duplicate to the rest of the region of the complete image may be varied smoothly, thereby the overall quality degradation may be prevented.

BRIEF DESCRIPTION OF THE DRAWINGS

FIGS. 5A to 5C are drawings illustrating how image data are adopted in combining the two image data groups.

FIG. 7 is a drawing illustrating the difference in noise element contained in different locations of the combined complete image.

DESCRIPTION OF THE PREFERRED EMBODIMENTS

Figure 1:
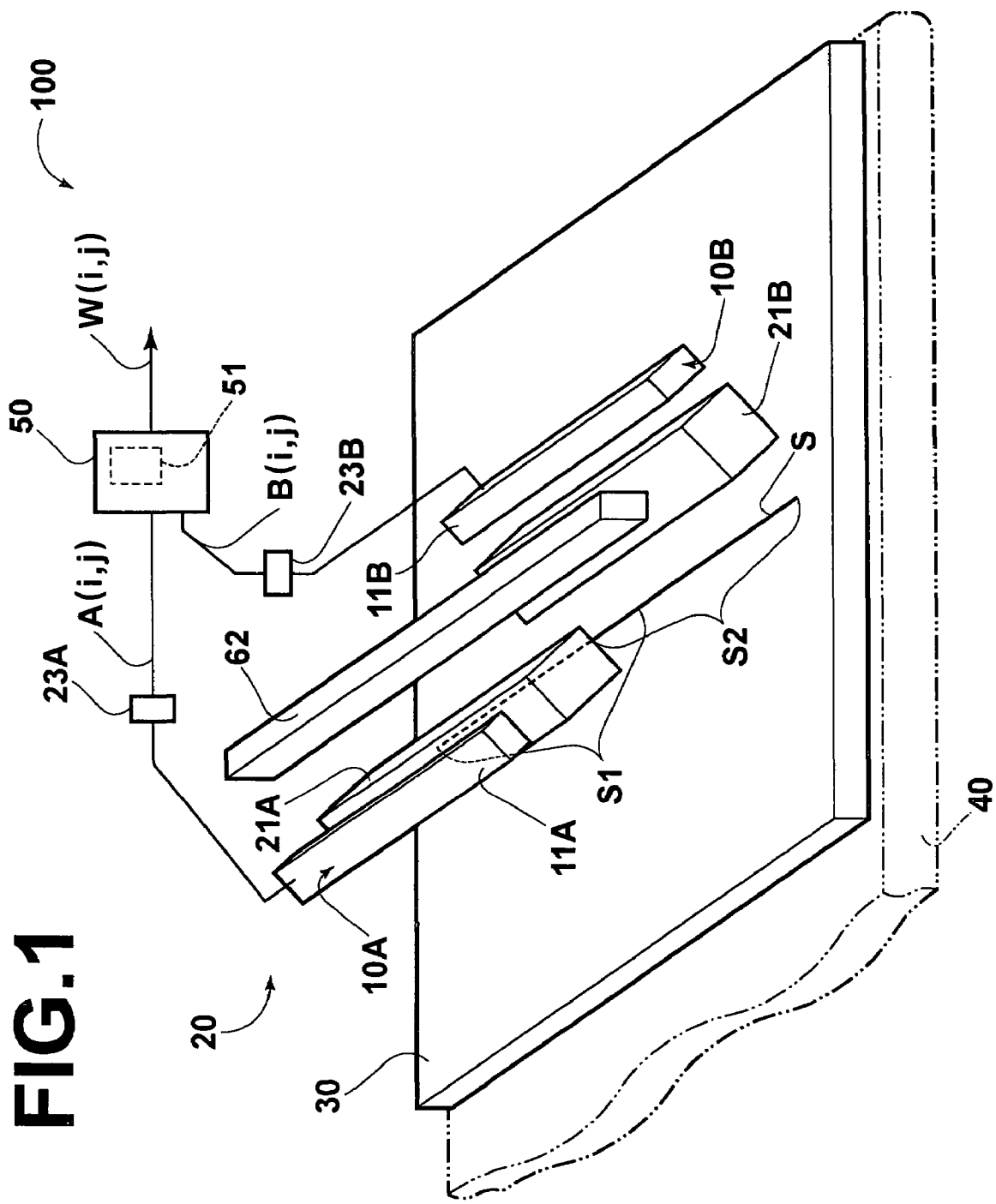
FIG. 1 is a perspective view of an image creating apparatus according to a preferred embodiment of the present invention, illustrating the schematic configuration thereof.

Hereinafter, the preferred embodiments of the present invention will be described with reference to the accompanying drawings. FIG. 1 is a perspective view of an image data creating apparatus according to a preferred embodiment of the present invention, and FIG. 2 is an enlarged perspective view thereof illustrating a path of light reflected at an original and focused at the light receiving sections of the linear detecting section to form an image.

Figure 2:
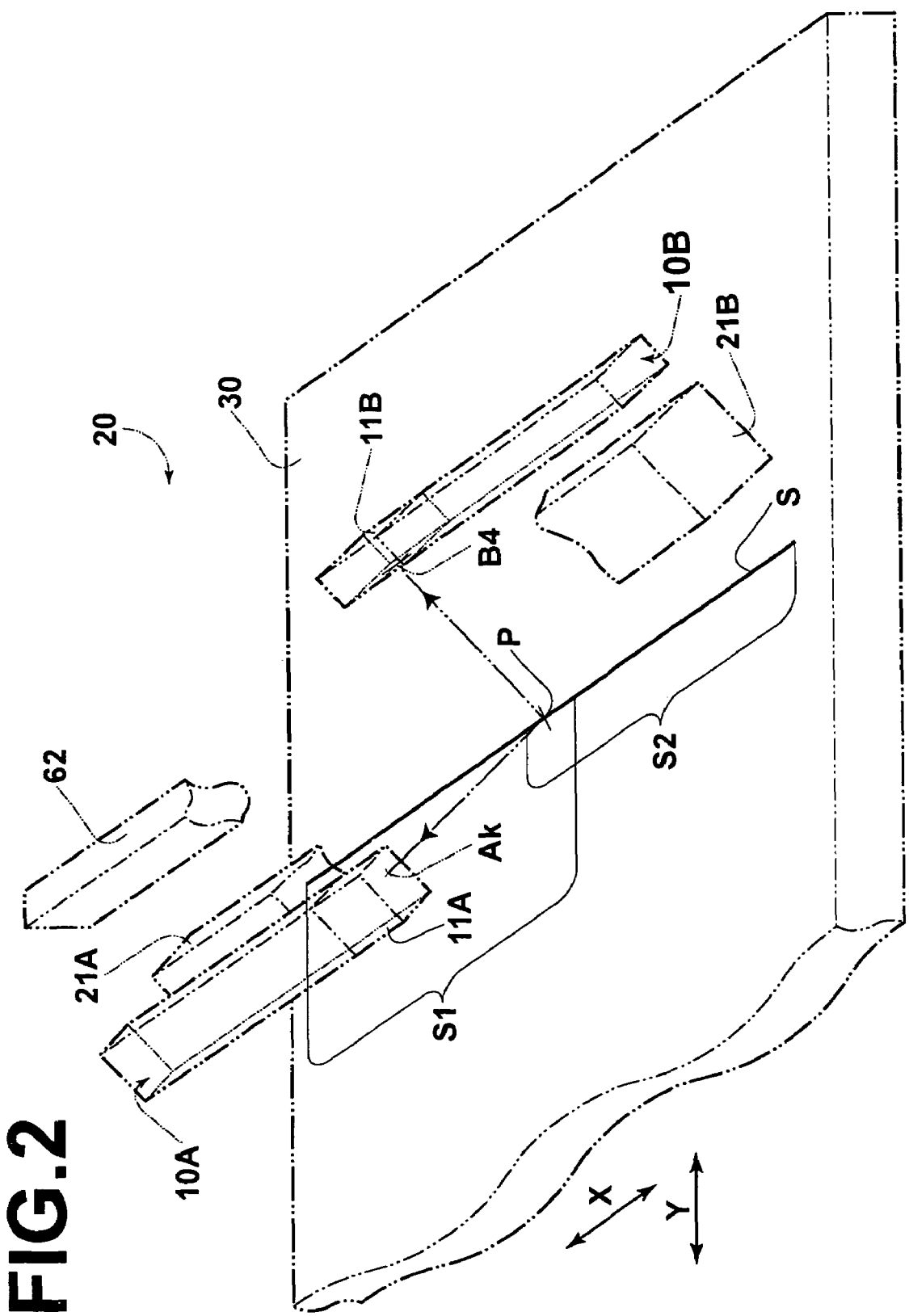
FIG. 2 is an enlarged perspective view of the apparatus in FIG. 1, illustrating a path of light reflected at an original and converged at the light receiving sections of the linear detecting section to form an image.

As shown in FIGS. 1 and 2, the image data creating apparatus 100 according to a preferred embodiment of the present invention comprises: a linear detecting section 20, which is a linear detecting means formed of linear sensors 10A and 10B, each having a plurality of light receiving sections arranged linearly, disposed in the main scanning direction (in the direction of the arrow X in the Figure, hereinafter referred to as "main scanning X direction") such that light receiving sections located on the end portions 11A and 11B of the respective linear sensors 10A and 10B detect the light emitted from the same position of an image carrier in duplicate; sub-scanning section 40, which is a scanning means for moving an original 30 (an image carrier) in the sub-scanning direction (in the direction of the arrow Y in the Figure, hereinafter referred to as "sub-scanning Y direction") crossing the main scanning X direction with respect to the linear detecting section 20; and an image data creating section 50, which is an image data creating means for creating image data representing the complete image information carried by the original 30 based on the image data obtained by the linear detecting means 20 by detecting the light emitted from the original 30 with the original 30 being moved in the sub-scanning Y direction with respect to the linear detecting section 20.

The image data creating section 50 comprises an image data selecting section 51 for selecting the image data obtained by either of the light receiving sections of the linear sensors 10A and 10B that have detected the light emitted from the same position in duplicate (hereinafter referred to as "mutually overlapped light receiving sections" for simplicity) as the image data representing the position the light therefrom has been detected by the light receiving sections of the linear sensors 10A and 10B in duplicate, and creates image data representing the complete image information by adopting image data selected by the image data selecting section 51 as the image data representing the position the light therefrom has been detected by the light receiving sections of the linear sensors 10A and 10B in duplicate, and the image data detected by the light receiving sections other than the mutually overlapped light receiving sections.

The linear detecting section 20 further comprises: image forming lenses 21A and 21B extending in the main scanning X direction, each comprising a gradient index lens and the like for forming an image of a region S extending linearly in the main scanning X direction of the original 30 on the light receiving sections of each of the linear sensors 10A and 10B; and A/D converters 23A and 23B for converting the electrical signal obtained by the light receiving sections of the respective sensors 10A and 10B by receiving the light propagated through the image forming lenses 21A and 21B to image data composed of digital values, in addition to the linear sensors 10A and 10B, and the image forming lens 21A forms an image of a region S1, which is a portion of the region S extending linearly in the main scanning X direction on the original 30, on the light receiving sections of the linear sensor 10A, and the image forming lens 21B forms an image of a region S2, which is a portion of the linear region S partly overlapped with the region S1, on the light receiving sections of the linear sensor 10B.

The original 30 is illuminated by a linear light source 62 comprising a plurality of LD light sources and toric lenses for focusing the light emitted from the LD light sources on the linear region S, and upon receiving the light from the light source 62, the light reflected at the linear regions S1 and S2 extending in the main scanning X direction on the original is converged as the images of S1 and S2 on the light receiving sections of the respective linear sensors 10A and 10B.

In selecting the image data obtained either of the mutually overlapped light receiving sections by inputting the image data outputted from the linear detecting section 20, the image data selecting section 51 selects the image data at random, and also in such a way that the image data obtained by a light receiving section located closer to the end of the respective linear sensor 10A and 10B are selected at a lower selection rate.

Figure 3:
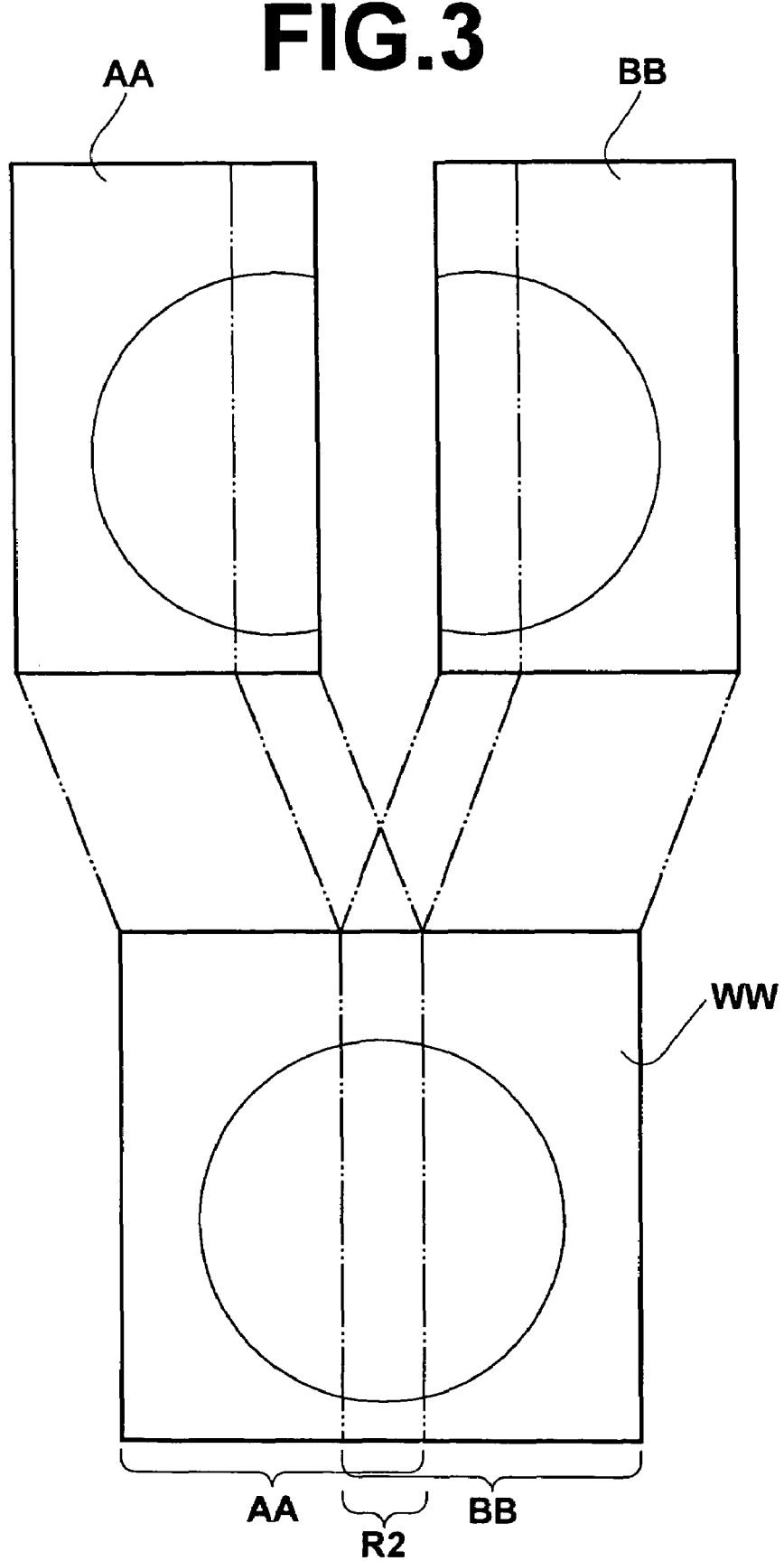
FIG. 3 is a drawing illustrating how image portions obtained by the two linear sensors are combined together.
Figure 4:
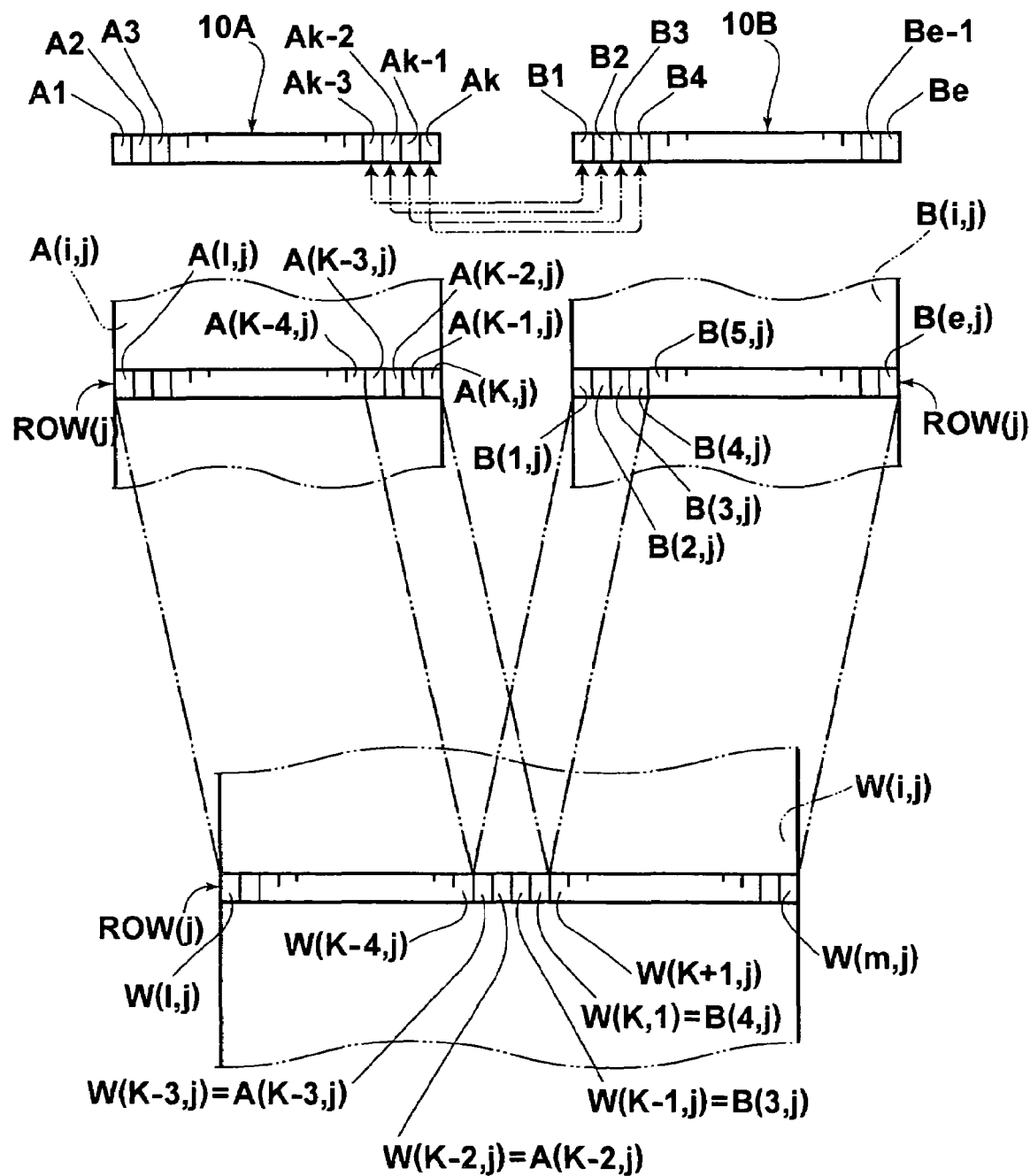
FIG. 4 is a conceptual diagram illustrating how two image data groups are combined together.
Figure 8:
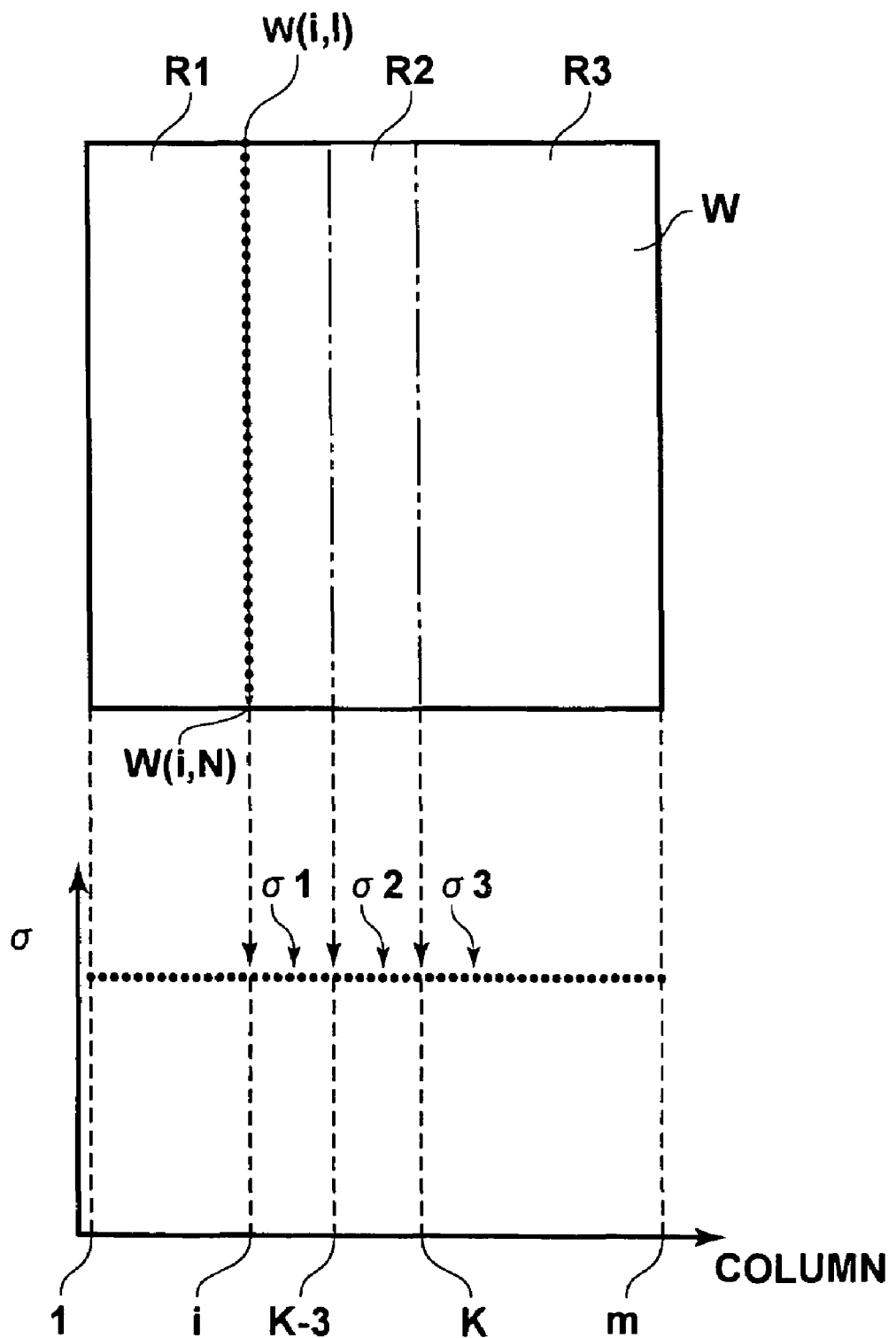
FIG. 8 is a drawing illustrating the difference in the standard deviation of noise element in different locations of the complete image.

The operation of the apparatus according to the preferred embodiment described above will be described herein below. FIG. 3 is a conceptual diagram illustrating how image portions obtained by the two linear sensors are combined together, FIG. 4 is a conceptual diagram illustrating how two image data groups are combined together, FIG. 5 is a drawing illustrating how image data are adopted in combining the two image data groups, FIG. 6 is a drawing illustrating the relationship between the location of the light receiving section and the selection rate of the image data group A or image data group B, FIG. 7 is a drawing illustrating the difference in noise element contained in different locations of the combined complete image, and FIG. 8 is a drawing illustrating the difference in the standard deviation of noise element in different locations of the complete image.

The original 30 is irradiated by the linear light source 62 with the original 30 being driven in the sub-scanning Y direction by the sub-scanning section 40. Upon irradiation of the light from the light source 62, the light reflected at the original 30 is focused as a image and received by the light receiving sections of the linear sensor A and the light receiving sections of the linear sensor B through the image forming lenses 21A and 21B respectively. For example, the light reflected at the position P included in the regions S1 and S2 of the linear region on the original 30 is focused as an image and received by a light receiving section Ak, which is one of the mutually overlapped light receiving sections located on the end portion 11A of the linear sensor 10A, and a light receiving section B4, which is the other of the mutually overlapped light receiving sections located on the end portion 11B of the linear sensor 10B through the image forming lenses 21A and 21B respectively (FIG. 2).

The light received by the light receiving sections of the linear sensor 10A is detected as an analog electrical signal, which is converted to a digital signal by the A/D converter 23A, and outputted as an image data group A, and the light received by the light receiving sections of the linear sensor 10B is detected as an analog electrical signal, which is converted to a digital signal by the A/D converter 23B, and outputted as an image data group B.

The image data group A and the image data group B detected by the linear detecting section 20 are inputted to the image data creating section 50, which combines them to create image data W representing a complete image WW of the original 30.

As shown in FIG. 3, the image portion AA of the original 30 represented by the image data group A detected and outputted from the linear sensor 10A, and the image portion BB of the original 30 represented by the image data group B detected and outputted from the linear sensor 10B are partly overlapped, i.e., the image region R2 represented by the image data obtained by the light receiving sections that have detected the light emitted from the same position in duplicate is overlapped. The image data creating section 50 creates the image data W by adopting the image data detected by either of the mutually overlapped light receiving sections as the data representing each of the positions representing the image region R2 in the complete image WW, when combining the image data groups A and B.

The process of creating image data representing the image region R2 by adopting the image data detected by either of the mutually overlapped light receiving sections as the data representing each of the positions representing original 30 will be described in detail.

As shown in FIG. 4, it is assumed that the linear sensor 10A has light receiving sections A1, A2, A3, - - -, Ak-3, Ak-2, Ak-1, and Ak, and the linear sensor 10B has light receiving sections B1, B2, B3, B4, - - -, Be-2, Be-1, and Be, forming pairs of the mutually overlapped light receiving sections of Ak-3 and B1, Ak-2 and B2, Ak-1 and B3, and Ak and B4. Therefore, the image portion AA is represented by the image data group A obtained by the light receiving sections A1, A2, A3, - - -, and Ak, and the image portion BB is represented by the image data group B obtained by the light receiving sections B1, B2, B3, - - -, and Be.

In creating image data for W(1,j) to W(m,j) of a row (j) in the image data W representing the complete image WW, the image data A(1,j) to image data A(k–4,j) in the image data group A are adopted, and for W(k+1, j) to w(m,j), the image data B(5,j) to image data B(e,j) in the image data group B are adopted.

For image data representing the image region R2 in the complete image WW, either the image data A(k–3,j) or image data B(1,j) are adopted as the image data W(k–3,j), either the image data A(k–2,j) or image data B(2,j) are adopted as the image data W(k–2,j), either the image data A(k–1,j) or image data B(3,j) are adopted as the image data W(k–1,j), and either the image data A(k, j) or image data B(4,j) are adopted as the image data W(k,j).

Since the image data obtained by one of the mutually overlapped light receiving sections located closer to the end of the linear sensor has a lower selection rate to be selected as the image data W, the image data A(k–3, j) are selected as the image data W(k–3,j), image data A(k–2,j) are selected as the image data W(k–2, j), image data B(3,j) are selected as the image data W(k–1, j), and image data B(4,j) are selected as the image data W(k,j).

That is, as shown in FIG. 5, in the column (k–3) of the image data W, i.e., the column where the column (k–3) of the image data group A and the column (1) of the image data group B are combined, the image data group A has a higher selection rate, and most of the image data in this column are selected from the image data group A, and in the column (k), i.e., the column where the column (k) of the image data group A and the column (4) of the image data group B are combined, the image data group B has a higher selection rate, and most of the image data in this column are selected from the image data group B. In FIG. 5A, a small circle in each of the positions of the image data group A indicates the position of the image data group A adopted as the image data representing the region R2, and a small circle in each of the positions of the linear sensor B in FIG. 5B indicates the position of the image data group B adopted as the image data representing the region R2. In FIG. 5C, the alphabet A or B in each of the positions of the image region R2 indicates which of the image data belonging to the image data group A or image data group B are adopted for the position.

Figure 6A:
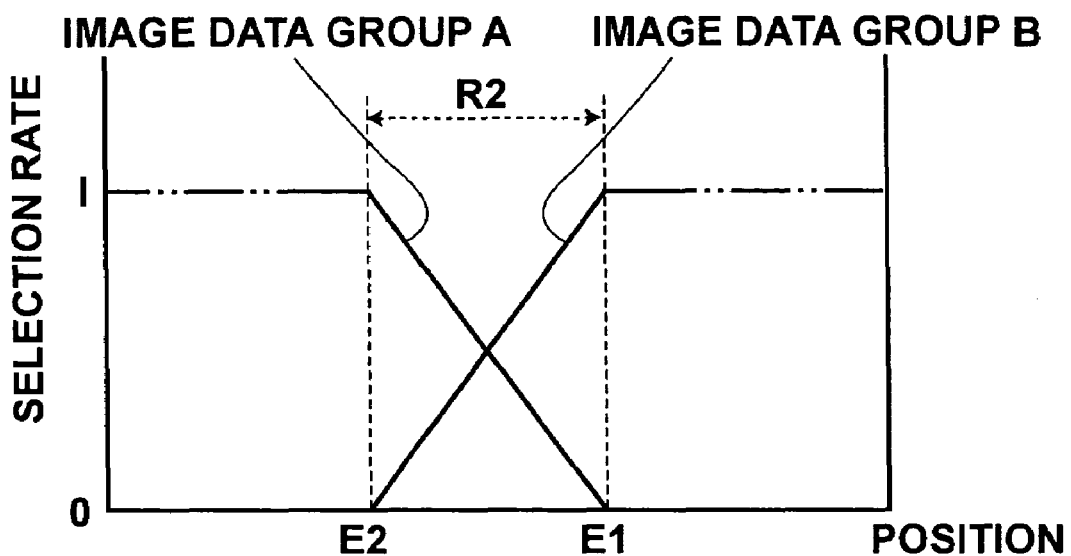
FIGS. 6A and 6B are drawings illustrating the relationship between the location of the light receiving section and the selection rate of the image data group A, or image data group B.
Figure 6B:
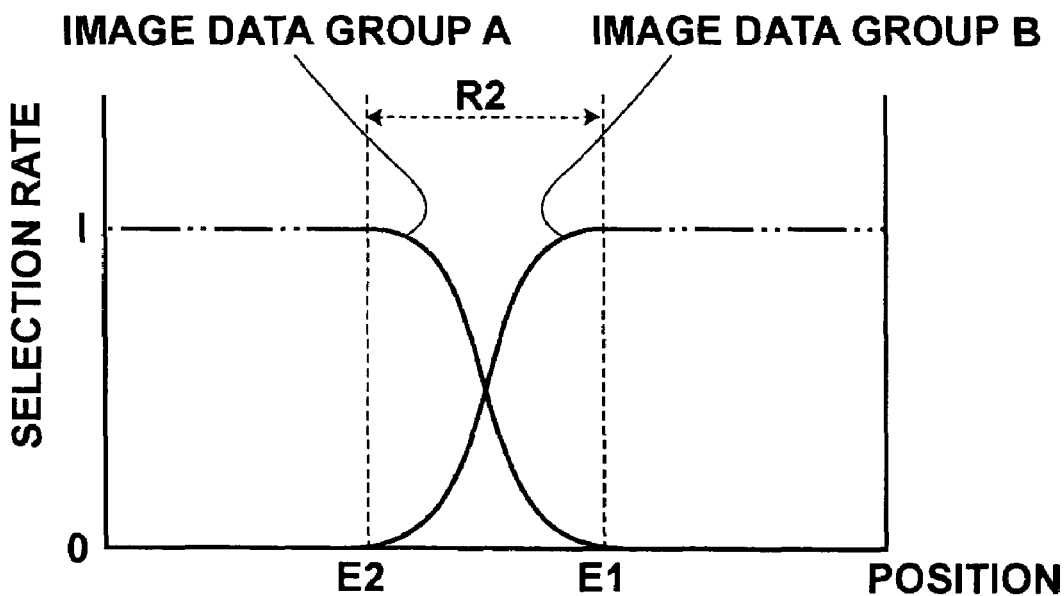

In the image region R2 described above, in allocating a lower selection rate to the image data obtained by the mutually overlapped light receiving sections located closer to the end of the linear sensor to be selected as the image data W, the relationship between the location of each of the light receiving sections and selection rate of the image data group A or image data group B obtained by each of the light receiving sections may be set as shown in FIG. 6. That is, as shown in FIG. 6A, the relationship may be such that the distance from the light receiving section on the end portion E1 of the linear sensor 10A (or on the end portion E2 of the linear sensor 10B)

to a certain light receiving section is proportional to the selection rate of the image data selected from the certain light receiving section, or the relationship between the distance from the light receiving section on the end portion E1 of the linear sensor 10A (or on the end portion E2 of the linear sensor 10B) to a certain light receiving section and the selection rate of the image data selected from the certain light receiving section may be such that it is represented by a monotonically increasing curve, more specifically, a monotonically increasing curve with its secondary differential coefficient varies in positive and negative.

Creating the image data W in this manner may keep the noise element appearing on the complete image WW uniform regardless of the region thereof. That is, as shown in FIG. 7, the standard deviations of noise σ1 of the image region R1 in the complete image WW formed by adopting the image data A, σ3 of the image region R3 in the complete image WW formed by adopting the image data B, and σ2 of the image region R2 in the complete image WW formed by adopting the image data A and image data B may be kept at substantially the same value.

More specifically, assuming that the original 30 is so-called a solid original having a uniform density over the whole region, and the standard deviation of noise contained in each of the image data in the linear region designated by the column (i), which is represented by the image data W(i, 1) to image data W(i,n) in the image data W(i,j) is σi in FIG. 8, there is no appreciable difference among the standard deviations of noise of the column (i), i=1 to k−4 in the image region R1 formed only of the image data A, column (i), i=k+1 to m in the image region R3 formed only of the image data B, and column (i), i=k−3 to k in the image region R2 formed by combining the image data A and image data B, so that the standard deviation of noise is substantially uniform regardless of the column.

Figure 9:
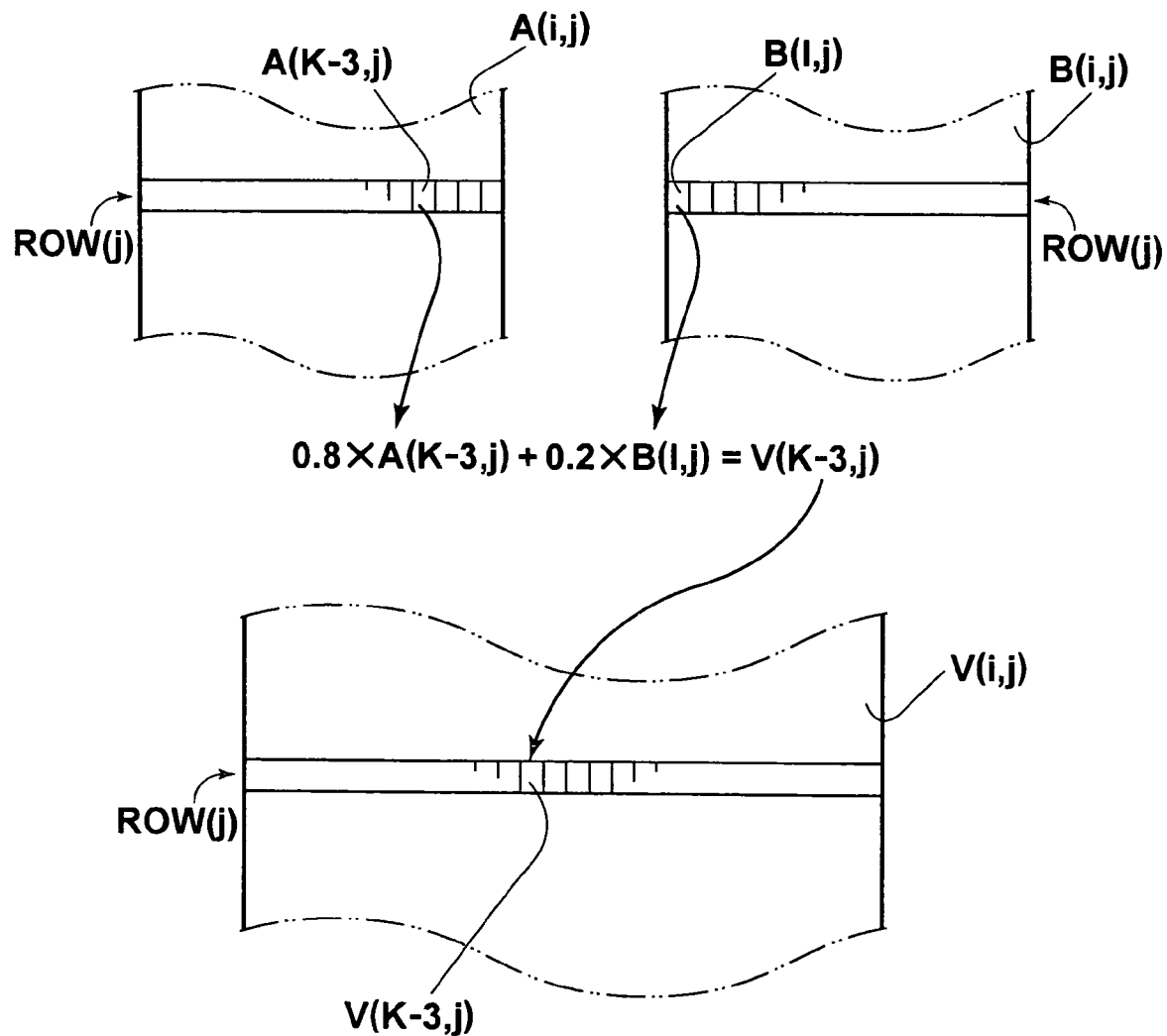
FIG. 9 is a drawing illustrating the technique for combining two image data groups in a comparative example.
Figure 10:
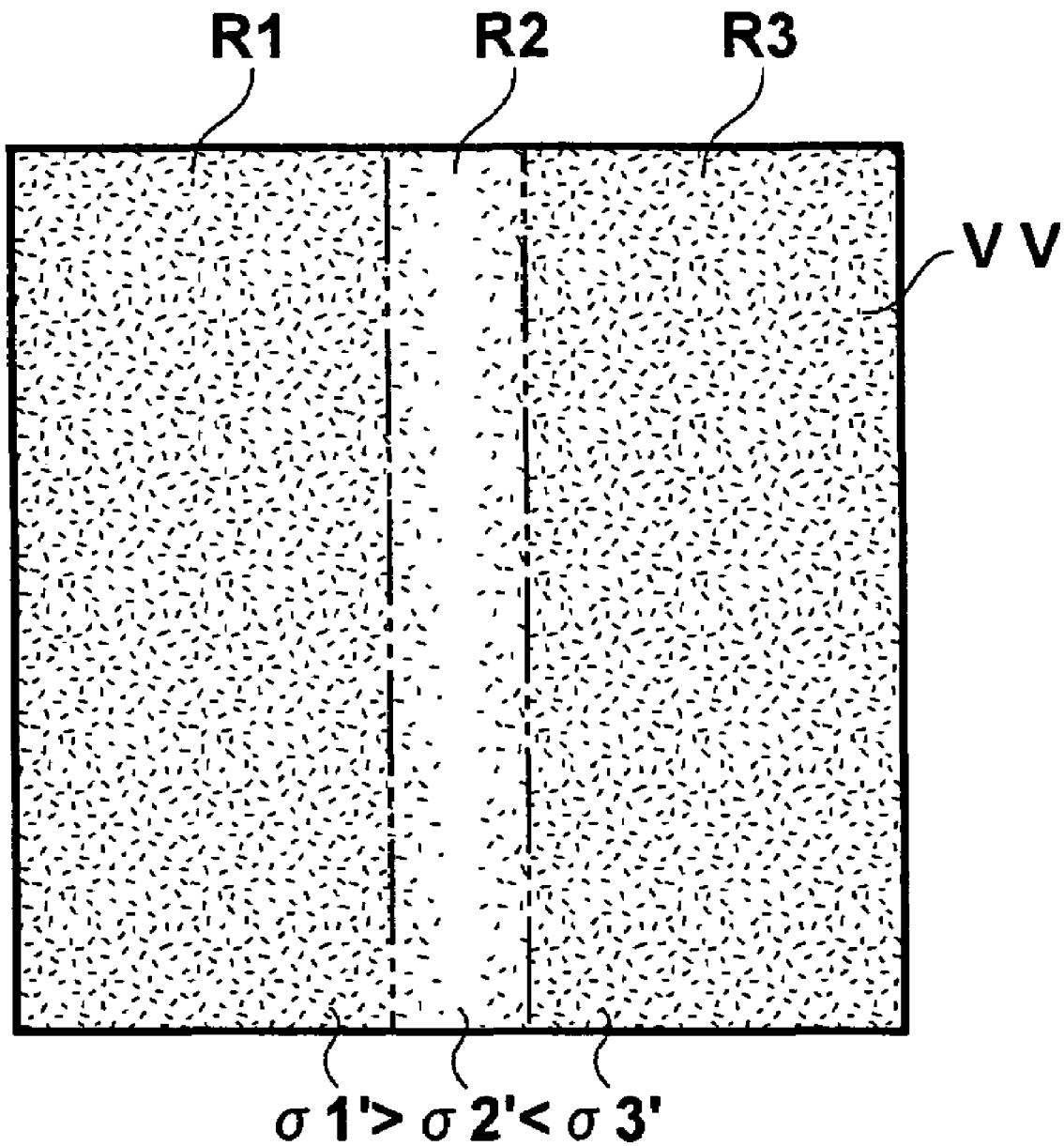
FIG. 10 is a drawing illustrating the difference in noise element contained in different locations of the combined complete image.
Figure 11:
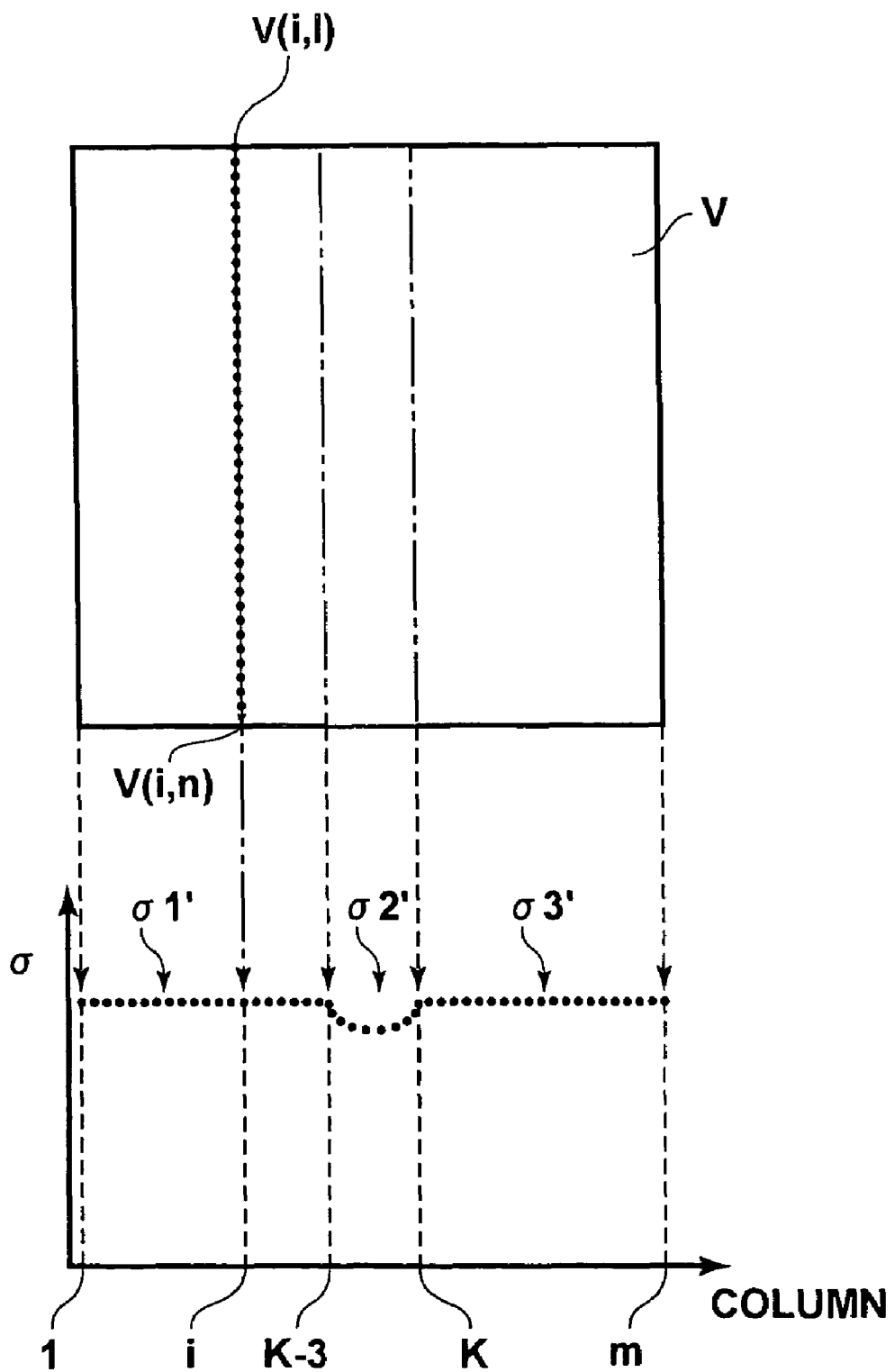
FIG. 11 is a drawing illustrating the difference in the standard deviation of noise element in different locations of the complete image.

The complete image WW represented by the image data W created in the aforementioned manner will be compared with an complete image VV represented by the image data V created, as a comparative example, by a technique which is different from that described above. FIG. 9 is a drawing illustrating the technique for combining two image data groups in a comparative example, and FIG. 10 is a drawing illustrating the difference in noise element contained in different locations of the combined complete image, and FIG. 11 is a drawing illustrating the difference in the standard deviation of noise in different locations of the complete image.

The image data V representing the complete image VV in the comparative example are created by combining the image data group A detected and outputted from the linear sensor 10A, and the image data group B detected and outputted from the linear sensor 10B, as in the preferred embodiment described above, but the image data creating method for the image region R2 represented by the image data obtained by the mutually overlapped light receiving sections is different from that in the preferred embodiment.

That is, the image data for the image region R2 are created by implementing weighted averaging on the image data group A and image data group B obtained by the mutually overlapped light receiving sections such that the image data obtained by a light receiving section located closer to the end of the sensor are allocated a smaller weighting factor to obtain a single set of image data for each of the positions in the image region R2.

More specifically, as shown in FIG. 9, the image data V(K−3,j) are obtained by first implementing weighted averaging on the image data A(k−3,j) belonging to the image data group A, and the image data B(1,j) belonging to image data group B, in which a smaller weighting factor of 0.2 is allocated to the image data B(1,j) which is obtained by a light receiving section located closer to the end of the linear sensor, and a greater weighting factor of 0.8 is allocated to the image data A(k−3,j), and then calculating: 0.2×value of image data B(1,j)+0.8×value of image data A(k−3,j). That is, the value of the image data V(k−3,j)=0.2×value of image data B(1,j)+0.8× value of image data A(k−3,j).

The noise element contained in the image data V(k−3,j) in the aforementioned manner becomes smaller than that contained in the image data A(k−3,j) or image data B(1,j) due to the averaging effect of the weighted averaging. When an equal weighting factor is allocated to the image data A and image data B, the noise reduction becomes maximal, and the noise contained in the central column in the image region R2 becomes the least.

That is, as shown in FIG. 10, the standard deviation σ2' of noise appearing on the image region R2 created by implementing the weighted averaging on the image data A and image data B is smaller than the standard deviation σ1' of noise appearing on the image region R1 created by adopting the image data A, or the standard deviations σ3' of noise appearing on the image region R3 created by adopting the image data B in the complete image vv.

More specifically, as shown in FIG. 11, in the linear region designated by the column (i), which is represented by the image data V (i,1) to image data V (i,n), the standard deviation of noise of the column (i), i=1 to k−4 in the image region R1 formed only of the image data A, and the standard deviation of noise of the column (i), i=k+1 to m in the image region R3 formed only of the image data B are substantially uniform regardless of the column. On the other hand, the standard deviation of noise of column (i), i=k−3 to k in the image region R2 formed by combining the image data A and image data B after being subjected to the weighted averaging is smaller that that of the regions R1, R2, and the standard deviation of noise in the center of the image region R2 becomes the least. The difference in the standard deviation of noise, i.e., the difference in noise in respective columns of the complete image appears as the difference in texture between the image regions R1 and R3, and the image region R2 in the image VV.

The image data may not necessary be created by allocating a smaller selection rate to the image data detected by one of the mutually overlapped light receiving sections located closer to the end of the linear sensor in order to obtain an effect of preventing quality degradation of the combined image.

Further, the original may be read out by the relative movement of the original and the linear detecting section in the sub-scanning direction, as well as by moving the original in the sub-scanning direction with respect to the linear detecting section. In that case, the linear detecting means may be moved, or the original and the linear detecting means may be moved simultaneously.

Further, the method for creating image data representing an complete image described above may also be applied to create image data representing a single complete image based on a plurality of image data groups, each representing a portion of the image sharing a common region. For example, the method may be used for combining small images projected by a plurality of projectors to create a single larger image, for combining three dimensional image data representing small regions to create a single larger three-dimensional image data, and the like.

As described above, the present invention may prevent quality degradation of an image created by combining a plurality of image portions sharing a common region.

Figure 12:
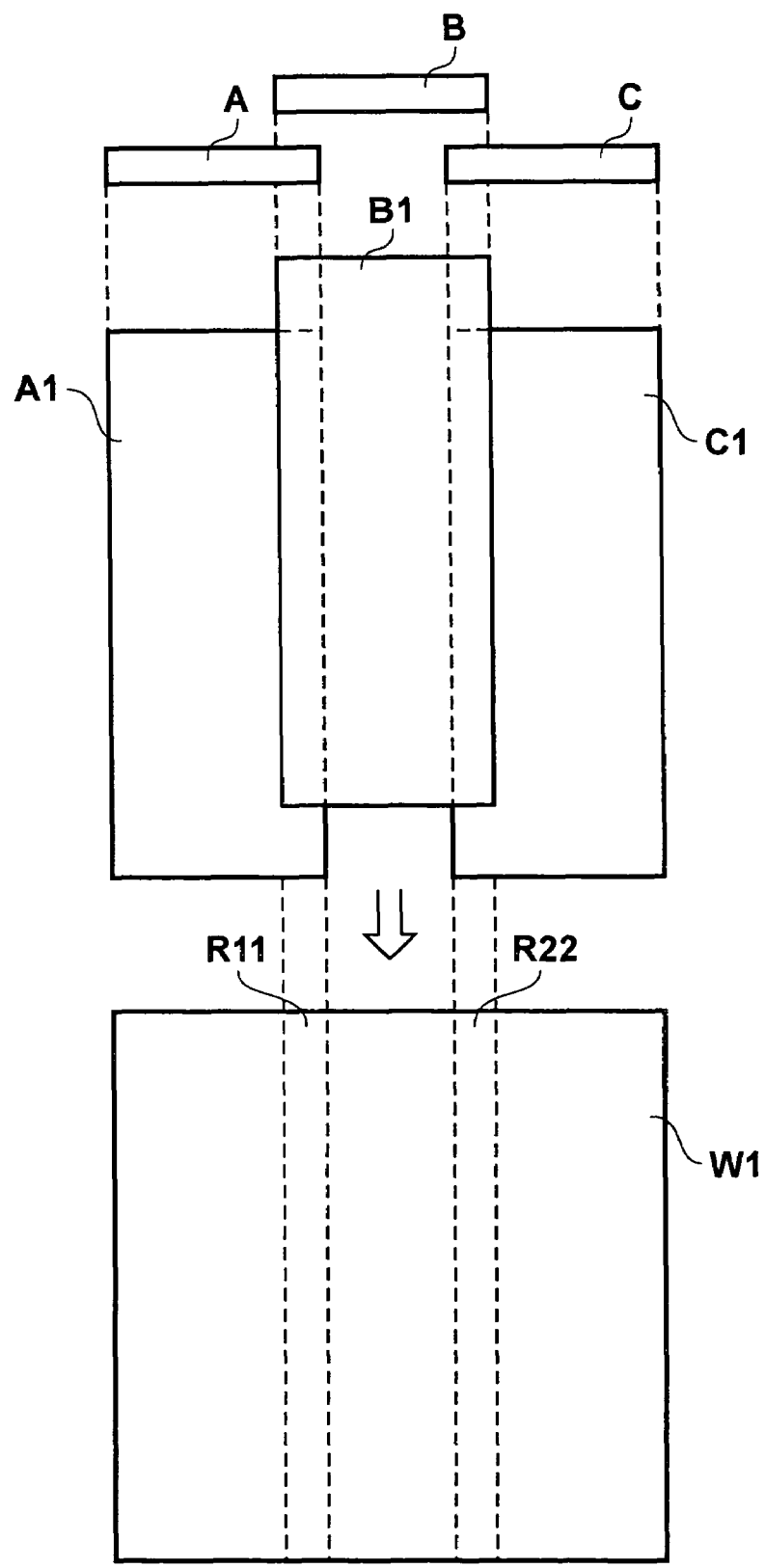
FIG. 12 is a drawing illustrating how image data are obtained by a linear detecting section formed of three linear sensors.

Although, in the preferred embodiment above, an example of a linear detecting means comprising two linear sensors was described, the linear detecting means may include any number of linear sensors unless they are arranged such that the light receiving sections located on the end portion of the respective linear sensors detect light emitted from the same position of an image carrier in duplicate. It is obvious that the identical effect to that described above may be obtained by using a linear detecting means comprising three or more linear sensors. For example, as shown in FIG. 12, the method described above may be applied to create the image data W1 using a linear detecting means comprising the linear sensors A, B, and C, in which the image data group A1 obtained by the linear sensor A, the image data group B1 obtained by the linear sensor B, and the image data group C1 obtained by the linear sensor C are combined to create the image data W1. In this case, the image data obtained by the light receiving sections that detect light in duplicate are located in the image region R11 where the image data groups A1 and B1 are combined, and the image region R22 where the image data groups B1 and C1 are combined.

Figure 13:
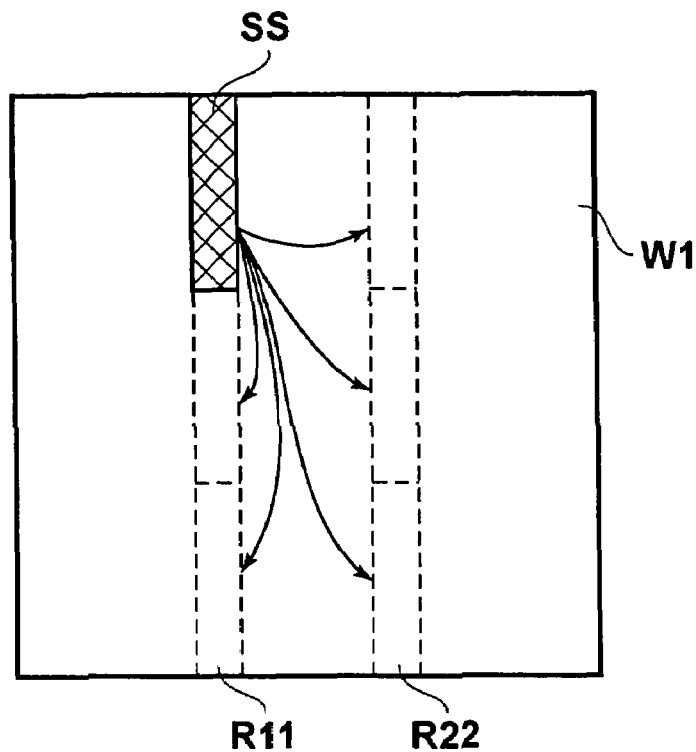
FIG. 13 is a drawing illustrating how each image data group is combined by repeating an adoption pattern applied to a portion of an image region.

As for the techniques employed in the image creating means described above for adopting image data obtained by either of the mutually overlapped light receiving sections, a method in which the decision is made based on the random numbers generated each time the image data representing the complete image information are created, or in accordance with a plurality of pre-arranged adoption patterns indicating which of the mutually overlapped light receiving sections is to be adopted may be employed. The adoption pattern described above is not limited to those that cover the whole of the image data obtained by the mutually overlapped light receiving sections. Instead, an adoption pattern that covers a portion of the image data may be used to cover the whole of the image data by repeating it. For example, as shown in FIG. 13, in combining three image data groups A1, B1, and C1 obtained by the linear detecting means comprising three linear sensors A, B, and C as described above, the image data W1 may be created by repeatedly applying the adoption pattern SS applied to a portion of the image region R11 to the other areas of R11 and R22 to determine the image data to be adopted.

Preferably, the adoption pattern may be those that are scrambled as much as possible to make the difference in the texture of noise element less distinguishable to human eyes.

The linear sensor may be a CCD device, CMOS device, and the like. In the preferred embodiment, the number of mutually overlapped light receiving sections on each linear sensor was four, but the number of the sections may be at least one. For example, 100 light receiving sections on each linear sensor may be overlapped with each other. Further, an area sensor having light receiving sections disposed in a two dimensional plane, e.g., in a plurality of rows and columns in the lengthwise and crosswise directions may be used as the linear sensor.

Figure 14:
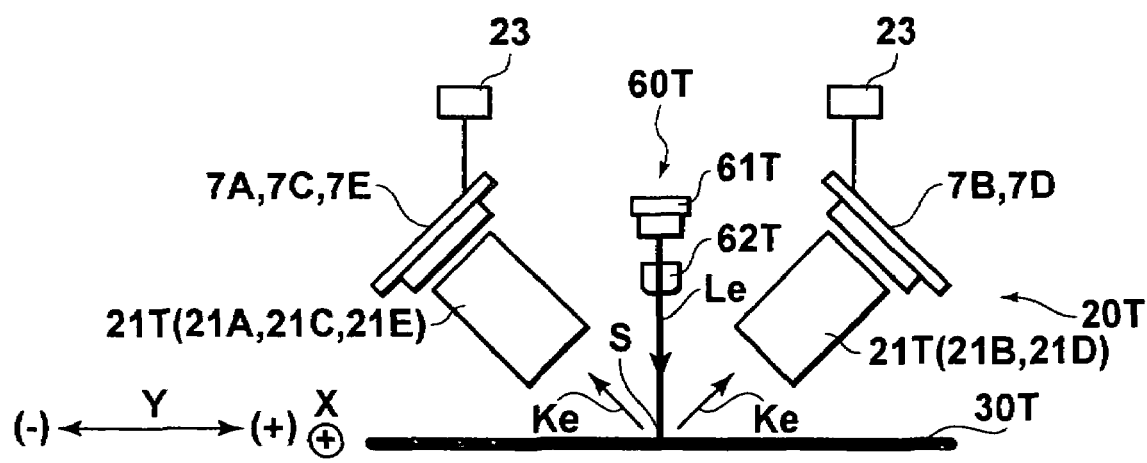
FIG. 14 is a side view illustrating an excitation light irradiating section, linear detecting section, and radiation image conversion panel.
Figure 15:
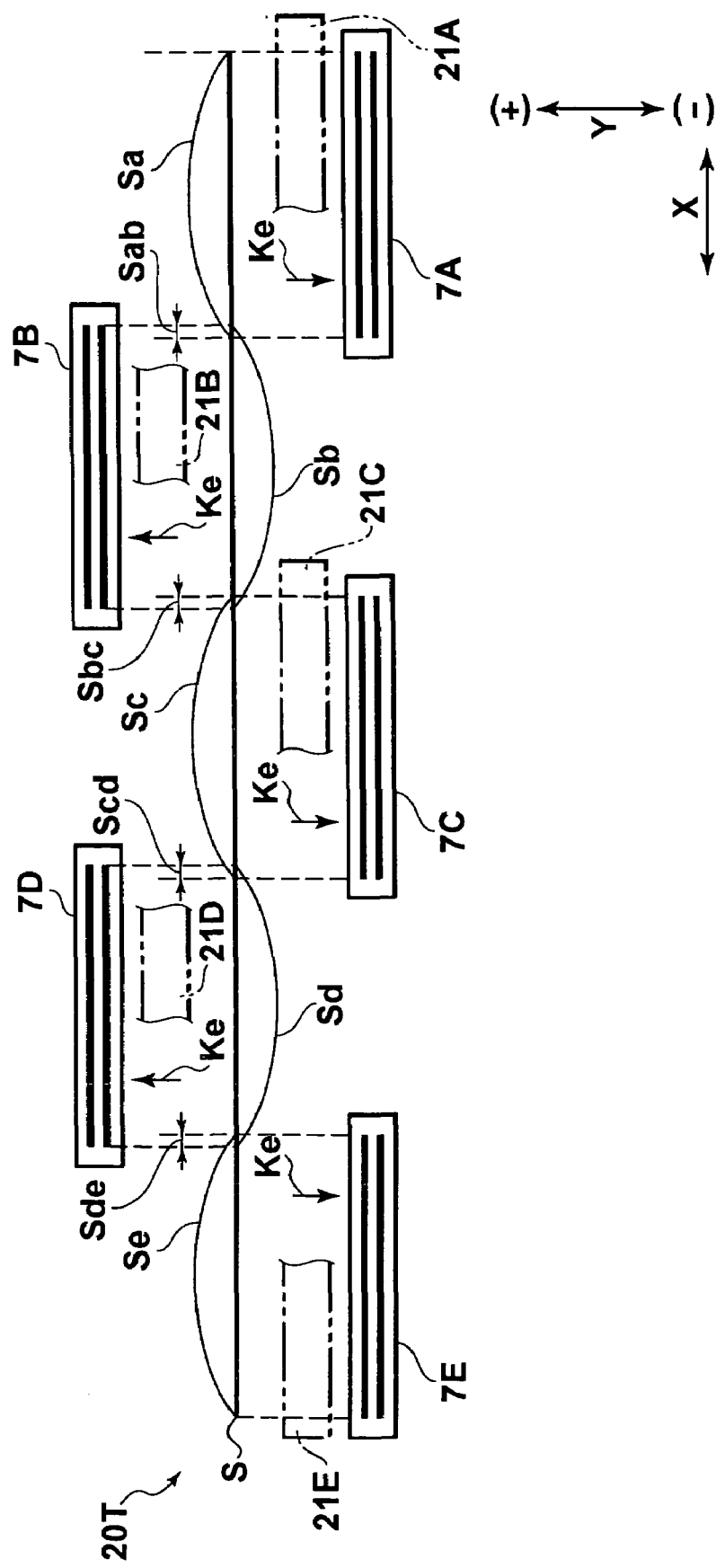
FIG. 15 is a surface view illustrating a physical relationship between the area of stimulated luminescence emitted from a radiation image conversion panel and a linear sensor receiving the stimulated luminescence.

If the original is a radiation image conversion panel, the radiation image recorded on the panel may be read out by providing an excitation light irradiating section that irradiates linear excitation light on the panel to excite the panel to emit stimulated luminescence from the linear region where the excitation light is irradiated, instead of using the linear light source. In this case, the light emitted from the radiation image conversion panel is stimulated luminescence. More specifically, as shown in FIG. 14, which is a side view illustrating an excitation light irradiating section, linear detecting section, and radiation image conversion panel, and FIG. 15, which is a surface view illustrating a physical relationship between the area of stimulated luminescence emitted from a radiation image conversion panel and a linear sensor receiving the stimulated luminescence, the radiation image recorded on the radiation image conversion panel 30T, which serves as a substitute for the original 30 may be read out by providing an excitation light irradiating section 60T, which serves as a substitute for the linear light source, and a linear detecting section 20T comprising five linear sensors.

The excitation light irradiating section 60T comprises an excitation light source 61T having a plurality of LDs disposed in the main scanning X direction, and a toric lens 62T for focusing excitation light Le, which is irradiated from each of the LDs of the excitation light source 61T in the direction perpendicular to the surface of the radiation image conversion panel 30T, on a region S extending linearly in the main scanning X direction on the conversion panel 30.

The linear detecting section 20T comprises five linear sensors 7A, 7B, 7C, 7D, and 7E, each having a plurality of LDs disposed in the main scanning X direction, arranged in the main scanning X direction such that the light receiving sections on the end portion of each of the linear sensors detect light emitted from the same position on the radiation image conversion panel 30T in duplicate. The linear sensors 7A, 7C, and 7E are disposed on the side which is in the sub-scanning −Y direction of the linear region S (in the direction indicated by the arrow −Y in the Figure), and the linear sensors 7B and 7D are disposed on the side which is in the sub-scanning +Y direction of the linear region S (in the direction indicated by the arrow +Y in the Figure). That is, the linear sensors 7A, 7C, and 7E, and the linear sensors 7B and 7D are disposed on opposite sides of the light path of the linear excitation light irradiated from the excitation light irradiation section 60T to the radiation image conversion panel 30T in a zigzag pattern.

In addition to the linear sensors 7A, 7B, 7C, 7D, and 7E, the linear detecting section 20T further comprises a image forming optical system 21T having five image forming lenses, which will be described later, for forming an image of the linear region S extending in the main scanning X direction of the radiation image conversion panel 30 on the light receiving sections of each of the linear sensors 7A, 7B, 7C, 7D, and 7E, and five A/D converters 23T for converting an electrical image signal obtained through a photoelectric conversion of the light received by the linear sensors 7A, 7B, 7C, 7D, and 7E to an image data composed of digital values. The image forming optical system 21T comprises image forming lenses 21A, 21B, 21C, 21D, and 21E, each formed of a plurality of gradient index lenses disposed in the main scanning X direction, and linear region segments Sa, Sb, Sc, Sd, and Se are imaged respectively on the linear sensors 7A, 7B, 7C, 7D, and 7E by the image forming lenses 21A, 21B, 21C, 21D, and 21E. With this arrangement, stimulated luminescence Ke emitted from each of the linear region segments Sa, Sb, Sc, Sd, and Se on the radiation image conversion panel 30T by the irradiation of the excitation light Le from the excitation light irradiating section 60T is focused as an image and received by each of the linear sensors 7A, 7B, 7C, 7D, and 7E.

The stimulated luminescence Ke emitted from the overlapped region Sab of the linear region segments Sa and Sb is detected by the light receiving sections located on the end of each of the linear sensors 7A and 7B, stimulated luminescence Ke emitted from the overlapped region Sbc of the linear region segments Sb and Sc is detected by the light receiving sections located on the end of each of the linear sensors 7B and 7C, stimulated luminescence Ke emitted from the overlapped region Scd of the linear region segments Sc and Sd is detected by the light receiving sections located on the end of each of the linear sensors 7C and 7D, and stimulated luminescence Ke emitted from the overlapped region Sde of the linear region segments Sd and Se is detected by the light receiving sections located on the end of each of the linear sensors 7D and 7E, and the image data representing each of the positions on the radiation image conversion panel 30T is obtained.

The image data obtained either of the mutually overlapped light receiving sections are selected by the image data selecting section as the image data representing the positions the light therefrom has been detected by the light receiving sections of the linear sensors 7A, 7B, 7C, 7D, and 7E in duplicate, and the image data representing the complete image information carried by the radiation image conversion panel are created by adopting the image data selected by the image data selecting section and those detected by the light receiving sections other than the mutually overlapped light receiving sections.

What is claimed is:

1. An image data creating method for creating image data representing a single complete image by combining a plurality of image data groups, each representing a portion of said image with a common region being shared with each other,
   wherein said image data representing said complete image are created by adopting either of a plurality of image data belonging to said respective image data groups and representing the same position in said common region of said complete image as the image data representing each of the positions in said common region.

2. The image data creating method according to claim 1, wherein said method is adapted to select the image data at random and further in such a way that the image data located closer to the end of said image data group are selected at a lower selection rate in adopting either of said plurality of image data.

3. An image data creating apparatus for creating image data representing a single complete image by combining a plurality of image data groups, each representing a portion of said image with a common region being shared with each other,
   wherein said image data representing said complete image are created by adopting either of a plurality of image data belonging to said respective image data groups and representing the same position in said common region of said complete image as the image data representing each of the positions in said common region.

4. The image data creating apparatus according to claim 3, wherein said apparatus is adapted to select said image data at random and further in such a way that the image data located closer to the end of said image data group are selected at a lower selection rate in adopting either of said plurality of image data.

5. An image data creating method for creating image data representing image information carried by an image carrier by detecting the light emitted from said image carrier with a linear detecting means formed of a plurality of sensors disposed in the main scanning direction such that the light receiving sections disposed on the end portion of each of said plurality of sensors detect the light emitted from the same position of the image carrier in duplicate, with said image carrier being moved in the sub-scanning direction that crosses the main scanning direction with respect to said linear detecting means,
   wherein said image data representing said complete image information are created by adopting the image data obtained by either of the light receiving sections of said plurality of sensors that have detected the light emitted from the same position in duplicate as the image data representing the position the light therefrom has been detected in duplicate.

6. The image data creating method according to claim 5, wherein said method is adapted to select the image data at random and further in such a way that the image data obtained by a light receiving section located closer to the end of the sensor are selected at a lower selection rate in selecting the image data obtained by either of said plurality of light receiving sections that have detected the light in duplicate.

7. An image data creating apparatus comprising:
   a linear detecting means formed of a plurality of sensors disposed in the main scanning direction such that light receiving sections located on the end portion of each of said plurality of sensors detect the light emitted from the same position of an image carrier in duplicate;
   a scanning means for moving said image carrier in the sub-scanning direction that crosses the main scanning direction with respect to said linear detecting means; and
   an image data creating means for creating image data representing image information carried by said image carrier based on the image data obtained by said linear detecting means by detecting the light emitted from said image carrier with said image carrier being moved in the sub-scanning direction that crosses the main scanning direction with respect to said linear detecting means,
   wherein said image data creating means comprises an image data selecting means for selecting the image data obtained by either of said light receiving sections of said plurality of sensors that have detected the light emitted from the same position in duplicate as the image data representing the position the light therefrom has been detected in duplicate, and the image data representing said complete image information are created by adopting the image data selected by said image data selecting means as the image data representing the position the light therefrom has been detected by said light receiving sections of said plurality of sensors in duplicate.

8. The image data creating apparatus according to claim 7, wherein said image data selecting means is adapted to select the image data at random and further in such a way that the image data obtained by the light receiving section located closer to the end of said sensor are selected at a lower selection rate in selecting the image data obtained by either of said plurality of light receiving sections that have detected the light in duplicate.

9. The image data creating apparatus according to claim 8, wherein said selection rate is approximately 0% for the image data obtained by the light receiving section located at the end of said sensor, approximately 100% for the image data obtained by the light receiving section that has detected the light in duplicate located at the far end from the end of said sensor, and is varied linearly for the image data obtained by the light receiving section located there between from 0% to 100% according to the location of said light receiving section.

10. The image data creating apparatus according to claim 9, wherein said selection rate is directly proportional to the distance from the end of said sensor to the light receiving section that has detected the light in duplicate.

11. The image data creating apparatus according to claim 8, wherein said selection rate is approximately 0% for the image data obtained by the light receiving section located at the end of said sensor, approximately 100% for the image data obtained by the light receiving section that has detected the light in duplicate located at the far end from the end of said sensor, and is varied linearly for the image data obtained by the light receiving section located therebetween from 0% to 100% according to the location of said light receiving section.

12. The image data creating apparatus according to claim 8, wherein said selection rate is directly proportional to the distance from the end of said sensor to the light receiving section that has detected the light in duplicate.

13. The image data creating apparatus according to claim 7, wherein said image data selecting means is adapted to select the image data from the plurality of image data obtained by said plurality of light receiving sections that have detected the light emitted from the same position in duplicate based on a predetermined selection rate which is defined such that the image data obtained by the light receiving section located closer to the end of said sensor are selected at a lower selection rate.

14. The image data creating apparatus according to claim 13, wherein said selection rate is approximately 0% for the image data obtained by the light receiving section located at the end of said sensor, approximately 100% for the image data obtained by the light receiving section that has detected the light in duplicate located at the far end from the end of said sensor, and is varied nonlinearly for the image data obtained by the light receiving section located therebetween from 0% to 100% according to the location of said light receiving section.

15. The image data creating apparatus according to claim 13, wherein said selection rate is directly proportional to the distance from the end of said sensor to the light receiving section that has detected the light in duplicate.

16. The image data creating apparatus according to claim 13, wherein said selection rate is approximately 0% for the image data obtained by the light receiving section located at the end of said sensor, approximately 100% for the image data obtained by the light receiving section that has detected the light in duplicate located at the far end from the end of said sensor, and is varied linearly for the image data obtained by the light receiving section located therebetween from 0% to 100% according to the location of said light receiving section.

17. The image data creating apparatus according to claim 16, wherein said selection rate is directly proportional to the distance from the end of said sensor to the light receiving section that has detected the light in duplicate.

* * * * *